United States Patent
Sawai et al.

[19]

[11] Patent Number: 6,111,713
[45] Date of Patent: Aug. 29, 2000

[54] RECORDING-MEDIUM MIS-RECORDING PREVENTING MECHANISM

[75] Inventors: Kunio Sawai; Hiroshi Hamahata; Shigeru Kaneko; Katsunori Onishi, all of Osaka, Japan

[73] Assignee: Funai Electric Co., Ltd., Osaka, Japan

[21] Appl. No.: 09/006,308

[22] Filed: Jan. 13, 1998

[30] Foreign Application Priority Data

Jan. 13, 1997 [JP] Japan ................................ 9-000090

[51] Int. Cl.⁷ .................................................. G11B 15/04
[52] U.S. Cl. ............................................................ 360/60
[58] Field of Search ..................................... 360/60, 128

[56] References Cited

FOREIGN PATENT DOCUMENTS 53-164125  5/1978  Japan .
59-86042   6/1984  Japan .
5-61827    8/1993  Japan .

*Primary Examiner*—W. Chris Kim
*Attorney, Agent, or Firm*—Lackenbach Siegel

[57] ABSTRACT

A recording-medium mis-recording preventing mechanism for preventing recording from being made by mistake on a recording medium loaded in a recording unit, comprises: a push switch for detecting whether the recording medium is recordable or not; and an arm portion. The arm portion includes: a first arm member pivoted on the recording unit and having a detection portion for abutting against a judgement claw provided on the recording medium so as to be removable by bending; a second arm member for pushing the push switch; a thin plate portion for connecting the first arm member and the second arm member; a spring provided between the first arm member and the second arm member for urging the second arm member in the direction to push the push switch; and a plate spring portion provided on the first arm member for making the arm portion return to a position in which the arm portion is to be positioned when no recording medium is loaded.

10 Claims, 4 Drawing Sheets

RECORDING-MEDIUM MIS-RECORDING PREVENTING MECHANISM

BACKGROUND OF THE INVENTION

The present invention relates to a recording-medium mis-recording preventing mechanism. Specifically, it relates to a recording-medium mis-recording preventing mechanism which is mounted on a recording unit such as a video tape deck, a cassette tape deck, a floppy disk drive, or the like, for judging whether it is possible or not to record images, sounds, etc. on a recording video tape, a recording cassette tape, a floppy disk, etc.

Any recording medium such as a video tape, a cassette tape, or a floppy disk is provided with a detection hole and a removable judgement claw for closing the detection hole in order to prevent images, sounds, etc. from being recorded in the recording medium by mistake. The judgement claw is removed by bending in video tapes or cassette tapes, while the judgement claw is removed by sliding in floppy disks.

On the other hand, a recording device such as a recordable video tape deck, a recordable cassette tape deck, or a floppy disk is provided with a recording-medium mis-recording preventing mechanism for detecting whether a judgement claw of a recording medium loaded therein has been removed or not, and judging whether it is possible to record on the recording medium or not.

FIG. 4 is a schematic perspective view of a prior art recording-medium mis-recording preventing mechanism mounted on a video tape deck, viewed from the upper surface side of a deck body. For the sake of simplification, the deck body is not shown.

This recording-medium mis-recording preventing mechanism has a push switch 200 for detecting whether recording can be carried out or not, and an arm portion 500 constituted by a first arm member 510 and a second arm member 520.

The first arm member 510 has an approximate L-shape in plan view and pivotally supported at a pivot portion 511 by means of a support shaft (not shown) provided on the deck body. A falling preventing bolt (not shown) is provided on the lower side of this support shaft so that the first arm member 510 can rotate around the support shaft. Flat blade portions 512 and 513 are provided on the both sides of the pivot portion 511, respectively. A level difference just equal to the thickness of the second arm member 520 is provided between these two blade portions 512 and 513. The blade portion 513 is set to be lower in height than the blade portion 512.

At the front end of the blade portion 512, a detection portion 514 is formed so as to project toward the upper side of the deck body. A protrusion 515 for detecting the existence of a judgement claw of a video tape is formed at the front end of this detection portion 514. In addition, at the front end of the blade portion 513, a support shaft 516 for pivotally supporting the second arm member 520 is provided so as to extend toward the upper side of the deck body.

The second arm member 520 is formed so as to have an approximately L-shape in plan view and pivotally supported with a pivot portion 524 which is fitted onto the support shaft 516 provided on the first arm member 510. In addition, a support portion 521 and a push portion 522 are provided on the both sides of the pivot portion 524, respectively. The support portion 521 is disposed between the two blade portions 512 and 513 of the first arm member 510, and the support portion 521 is designed to be supported on the upper surface of the blade portion 513 so that the second arm member 520 is difficult to be detached from the support shaft 516.

A switch surface 523 for pushing a switch pin 210 of the push switch 200 provided in the deck body is formed at the front end of the push portion 522. This push switch 200 constitutes a portion of a circuit taking charge of recording, so that a recording medium is not recordable when the push switch 200 is turned off, and the recording medium can be held to be recordable when the push switch 200 is turned on.

A spring 540 is laid between the blade portion 513 of the first arm member 510 and a spring fixation portion 220 of the deck body. The spring 540 urges the arm portion 500 away from the push switch 200 (in the direction of the arrow A in FIG. 4).

A spring 530 is laid between the blade portion 513 of the first arm member 510 and the push portion 522. The spring 530 urges the push portion 522 to move forward toward the push switch 200 (in the direction of the arrow B in FIG. 4).

Then, the restoration force of the spring 530 between the blade portion 513 and the spring fixation portion 220 is set stronger than the restoration force of the spring 540 between the blade portion 512 and the push portion 522. Therefore, since the protrusion 515 enters a detection hole when no video tape is set in the deck body, the push switch 200 is not turned on though the push portion 520 is pulled toward the push switch 200 by the spring 530. Accordingly, recording is impossible.

When a video tape is set with its judgement claw not removed, the judgment claw abuts against the protrusion 515 of the detection portion 514 so that the first arm member 510 is pushed out in the counter direction of the arrow A in FIG. 4. Then, the second arm member 520 also rotates toward the push switch 200 (in the direction of the arrow B in FIG. 4) together with the first arm member so that the switch surface 523 of the push portion 522 abuts against the switch pin 210 of the push switch 200. That is, since the restoration force of the spring 530 is stronger than the restoration force of the spring 54, the rotation force of the arm portion 500 is strong enough to overcome the resistance force of the switch pin 210, so that the push portion 522 turns the push switch 200 on.

Usually, the push switch 200 is of standardize products. However, the force pushing the push pin 210 generated by the judgement claw of the video tape is sometimes too much strong, and the push switch 200 may be broken by such a strong force. Therefore, it is necessary to soften the shock in order to prevent from hitting the push pin 210 by the switch surface 523 with the strong force.

In this example, since the push portion 522 is urged toward the push switch 200 by the spring 530, the shock when the judgement claw of the video tape abuts against the protrusion 515 of the detection portion 514 is softened by the counter restoration force of the spring 530.

In addition, when the video tape is extracted, the first arm member 510 is pulled in the direction of the arrow A in FIG. 4 by the restoration force of the spring 540 to return to its initial position. At the same time, the switch surface 523 is separated from the switch pin 210 so that the push switch 200 is turned off and the push portion 522 is also returned to its initial position by the spring 530.

Not to say, when a video tape is inserted with its judgement claw being removed, the protrusion 515 of the first arm member 510 is inserted into the detection hole of the video tape, so that the first arm member 510 is not pushed out, and hence the push switch 200 is not turned on. Accordingly, the video tape is not made recordable, so that it is possible to prevent recording on the video tape by mistake.

However, in this recording-medium mis-recording preventing mechanism, at least four constituent parts, that is, the first arm member 510, the second arm member 520 and the two springs 530 and 540 were required. As a result, the manufacturing cost increased, and assembling those constituent parts was troublesome.

In addition, it is also possible to omit the spring 540 provided between the blade portion 513 and the second arm member 520 if the first arm member 510 and the second arm member 520 are integrated. But if the members 510 and 520 are integrated simply, a shock generated between the judgement claw and the first arm member 510 at the time of loading the video tape is conducted directly to the push switch 200 without being reduced which adversely affects the durability of the push switch 200.

SUMMARY OF THE INVENTION

Taking the foregoing defects in the conventional example into consideration, it is an object of the present invention to simplify the structure of a recording-medium mis-recording preventing mechanism without conducting a shock, at the time of inserting a recording medium to a push switch which detects whether the recording medium is recordable or not.

According to the present invention, a recording-medium mis-recording preventing mechanism for preventing recording from being made by mistake on a recording medium loaded in a recording unit, comprises: a push switch for detecting whether the recording medium is recordable or not; an arm portion including a first arm member pivoted on the recording unit and having a detection portion for abutting against a judgement claw provided on the recording medium so as to be removable by bending, a second arm member for pushing the push switch, a thin plate portion for connecting the first arm member and the second arm member, and a plate spring portion provided on the first arm member for making the arm portion return to a position in which the arm portion is to be positioned when no recording medium is loaded; and a spring provided between the first arm member and the second arm member for urging the second arm member in the direction to push the push switch.

DETAILED DESCRIPTION OF THE PREFERRED EMBODIMENTS

Figure 1:
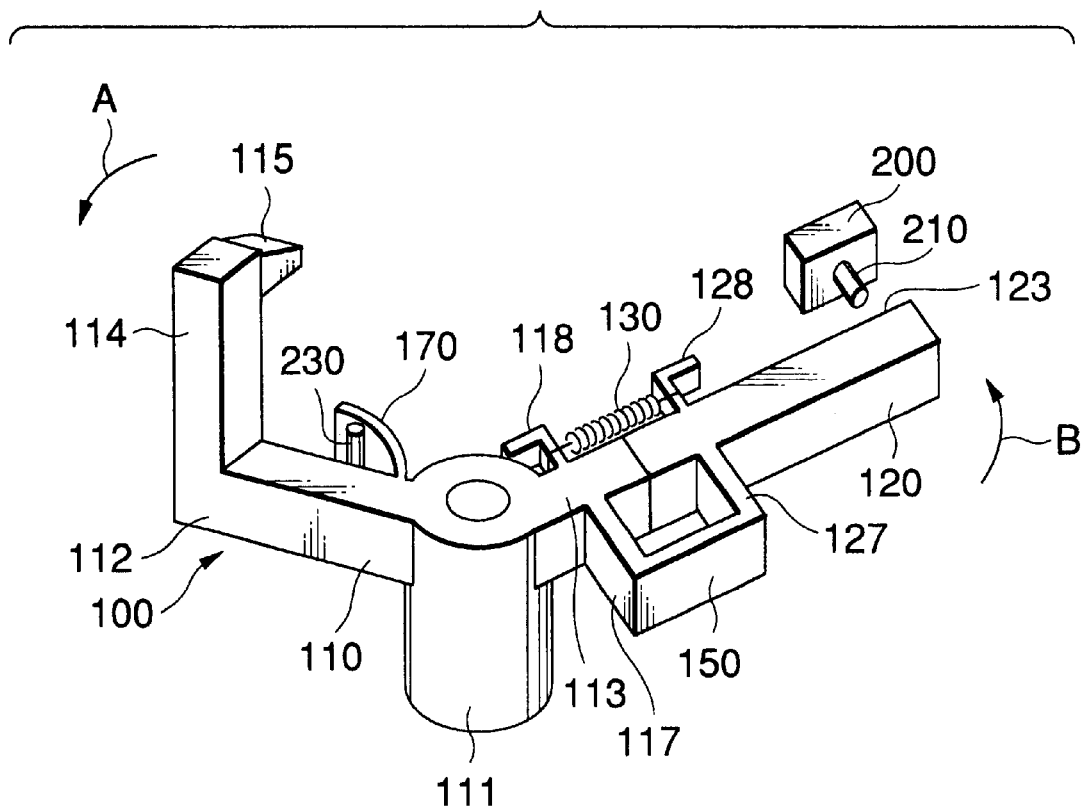
FIG. 1 is a schematic perspective view of a recording-medium mis-recording preventing mechanism as an embodiment of the present invention.
Figure 2:
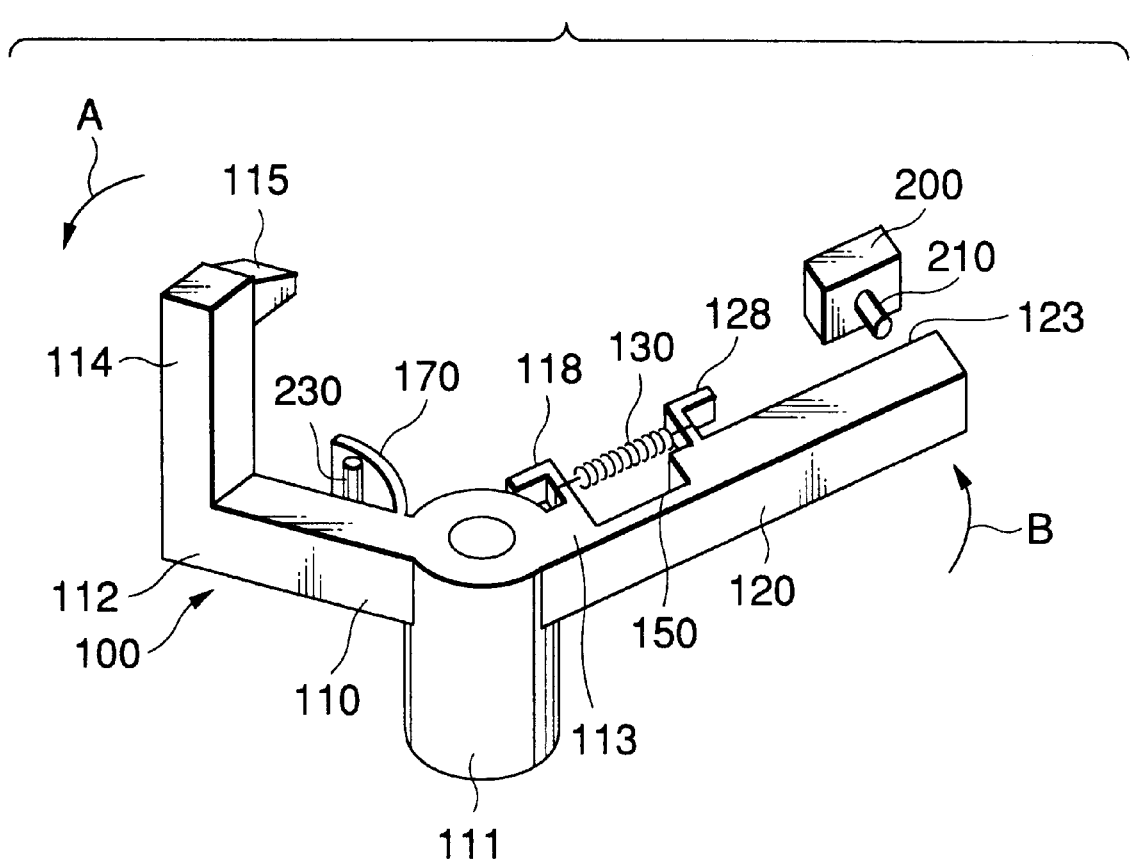
FIG. 2 is a schematic perspective view of a recording-medium mis-recording preventing mechanism as another embodiment of the present invention.
Figure 3:
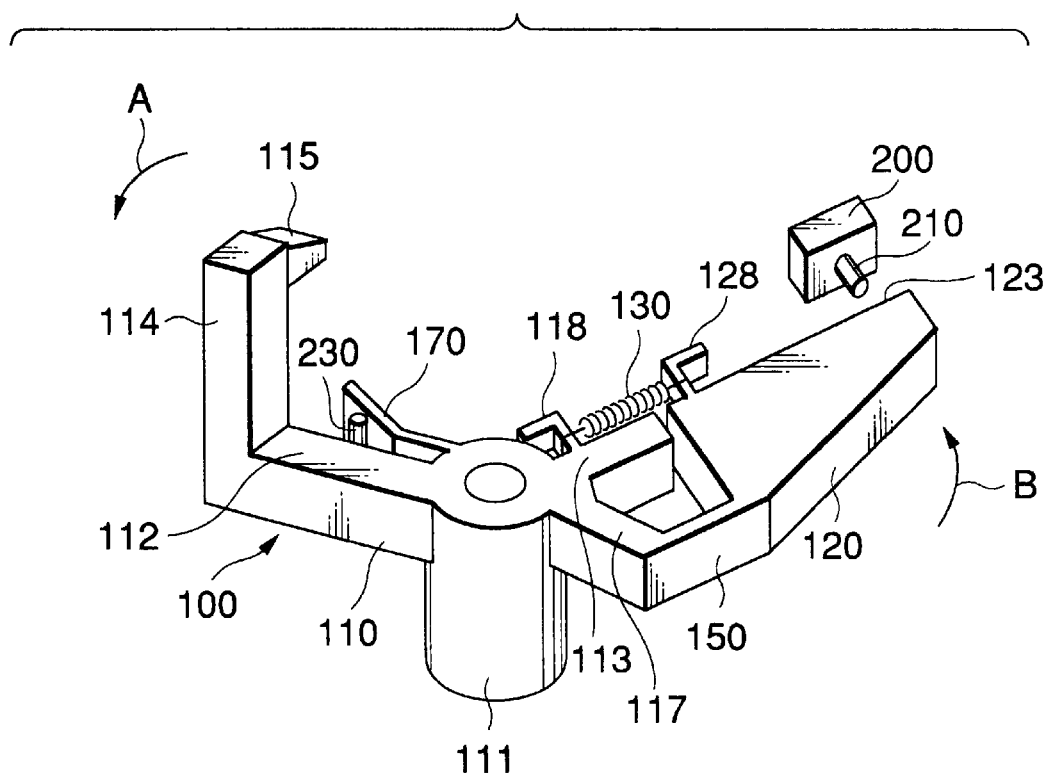
FIG. 3 is a schematic perspective view of a recording-medium mis-recording preventing mechanism as a further embodiment of the present invention.
Figure 4:
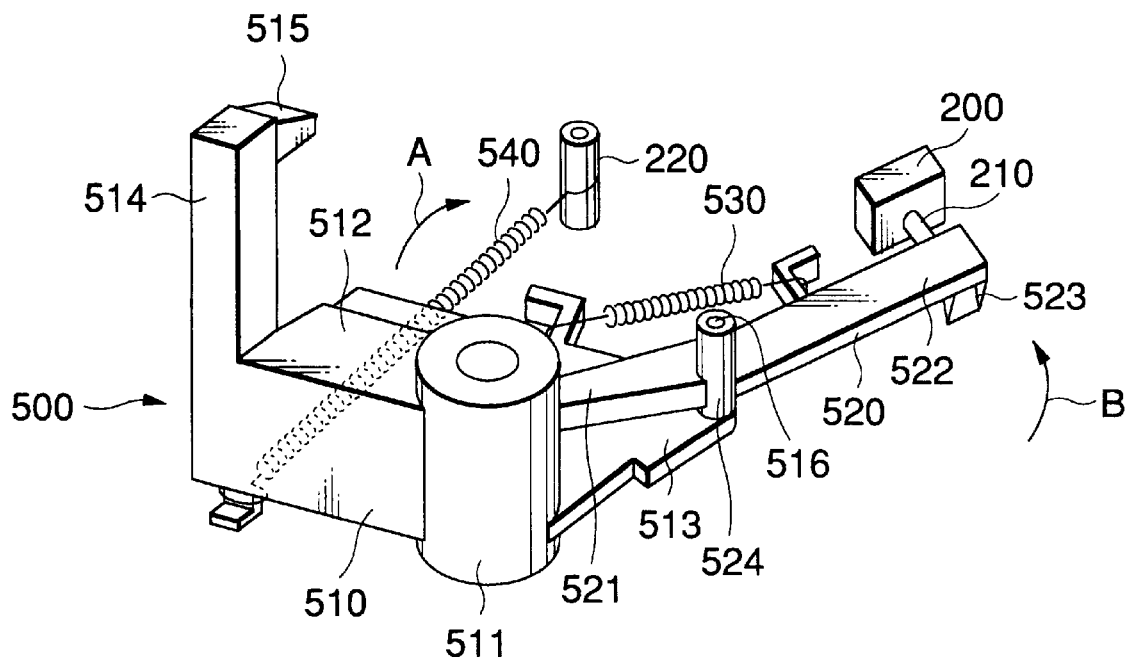
FIG. 4 is a schematic perspective view of a recording-medium mis-recording preventing mechanism as a conventional example.

FIG. 1 is a schematic perspective view of a recording-medium mis-recording preventing mechanism as an embodiment of the present invention, FIG. 2 is a schematic perspective view of a recording-medium mis-recording preventing mechanism as another embodiment of the same, and FIG. 3 is a schematic perspective view of a recording-medium mis-recording preventing mechanism as a further embodiment of the same. Each of these drawings shows the mechanism used in a video tape deck. Also in these drawings, a deck body is omitted, for the sake of simplification.

A recording-medium mis-recording preventing mechanism according to the present invention includes, as shown in the respective drawings, a push switch 200 for detecting whether recording can be carried out or not, and an arm portion 100 for turning the push switch 200 on/off. The push switch 200 constitutes a portion of a circuit taking charge of recording in the same manner as in the conventional example, so that images cannot be recorded on the video tape when the push switch 200 is turned off, and the video tape can be held to be recordable when the push switch 200 is turned on.

An arm portion 100 includes: a first arm member 110 pivoted on a deck body and having a detection portion 114 for abutting against a judgement claw provided on a video tape so as to be removable by bending; a second arm member 120 for pushing the push switch 200 provided on the deck body; a thin plate portion 150 for connecting the first arm member 110 and the second arm member 120 to each other; a spring 130 (second elastic member) provided between the first arm member 110 and the second arm member 120 for urging the second arm member 120 toward the push switch 200; and a plate spring portion 170 (also know as a first elastic member) provided on the first arm member 110 for making the arm portion 100 return to its position in the condition that no video tape (recording medium) is inserted. Except the spring 130, all the parts are integrally formed, for example, from a plastic material. In this embodiment, the spring 130 is a coil spring.

In the first arm member 110 of the arm portion 100 shown in FIG. 1, shaft-rod-like blade portions 112 and 113 are formed into an approximate L-shape in plan view, on the both sides of an approximately cylindrical pivot portion 111, respectively. At the front end of the blade portion 112, a detection portion 114 is formed to project toward the upper side of the deck body. A protrusion 115 for detecting the existence of a judgement claw of a video tape is formed at the front end of this detection portion 114.

In addition, a curved plate spring portion 170 for making the rotated arm portion 100 return to its initial position, that is, the position where the arm portion 100 should be located in the case where no video tape is set (the position in the condition that no recording medium is inserted) is provided on a side portion of the blade portion 112. A shaft portion 230 provided on the deck body comes into between the plate spring portion 170 and the blade portion 112. When a judgement claw of a video tape abuts against the detection portion 114, the arm portion 100 rotates outside (in the direction of the arrow A in FIG. 1). At this time, a restoration force is, however, generated in the plate spring portion 170 abutting against the shaft portion 230 by the rotation of the arm portion 100.

An approximately L-shaped spring support portion 118 for supporting the spring 130 is provided to project over a side portion of the blade portion 113 near its front end. In addition, a thin plate support portion 117 for mounting a deformable portion or thin plate portion 150 thereon is provided, to project outside, on the side portion opposite to the spring support portion 118.

The second arm member 120 is formed in the form of a shaft/rod having an end surface almost as large as the blade portion 113. The end surface abuts against an end surface of the blade portion 113. A switch surface 123 is formed at the front end of this second arm member 120. By the rotation of the arm portion 100, the switch surface 123 abuts against the switch pin 210 of the push switch 200 so that the push switch 200 can be turned on.

Another thin plate support portion 127 for mounting the thin plate portion 150 thereon is also provided, to project, on a side portion of the second arm member 120 near its end surface. In addition, an approximately L-shaped spring support portion 128 for supporting the spring 130 is provided, to project, on the side opposite to the thin plate support portion 127.

The first arm member 110 and the second arm member 120 are connected to each other through the thin plate portion 150 provided between the thin plate support portion 117 and the thin plate support portion 127. An urging force to make the second arm member 120 move toward the push switch 200 (in the direction of the arrow B in FIG. 1) is provided to the second arm member 120 by the spring 130 disposed between the spring support portion 118 and the spring support portion 128. As a result, the end surfaces of the first arm member 110 and the second arm member 120 are maintained abutting against each other by the restoration force of the spring 130. Therefore, the length and thickness of the thin plate portion 150 can be set suitably in accordance with the resistance force or the like of the spring 130 or the switch pin 210.

In addition, since the end surfaces of second arm member 120 and the first arm member 110 are kept to abut against each other, they do not rotate toward the push switch 200 beyond a predetermined extent. Accordingly, when no video tape is set, the switch surface 123 is separated from the switch pin 210 so that the push switch 200 is maintained as not turned on.

On the other hand, when a video tape with a judgement claw not removed is inserted into the deck body, the judgement claw of the video tape abuts against the protrusion 115 of the detection portion 114, so that the arm portion 100 rotates as a whole in the direction of the arrow A in FIG. 1 by the loaded video tape. Then, the switch surface 123 abuts against the switch pin 210 of the push switch 200.

In addition, at the beginning of the switch surface 123 abutting against the switch pin 210, the resistance force of the switch pin 210 overcomes the restoration force of the spring 130, so that the second arm member 120 connected by the thin plate portion 150 rotates in the direction of the arrow B in FIG. 1. However, the rotation force of the arm portion 100 is so large that it overcomes the resistance force of the switch pin 210 to thereby make the second arm member 120 further rotate. Then, the push switch 200 is turned on so that the video tape becomes recordable. At this time, a shock given to the arm portion 100 by the inserted video tape is softened by the thin plate portion 150 and the spring 130. Accordingly, the influence of the shock on the push switch 200 can be reduced in the same manner as in the conventional cassette-medium mis-recording preventing mechanism.

On the other hand, when the video tape is extracted, the arm portion 100 rotates in the direction counter to the direction of arrow A in FIG. 1 by the restoration force generated in the plate spring portion 170, thereby separating the switch surface 123 from the switch pin 210 and turning off the push switch 200. In addition, when the switch surface 123 is separated from the switch pin 210, the end surface of the blade portion 113 and the end surface of the second arm member 120 then abut against each other by the return force of the spring 130 as they were in their initial positions.

An arm portion 100 shown in FIG. 2 is the same in structure as the arm portion 100 shown in FIG. 1 except for the structure of connection between the first arm member 110 and the second arm member 120.

Without providing the thin plate support portions 117 and 127, the first arm member 110 and second arm member 120 of the arm portion 100 are connected directly with the thin plate portion 150 on their side end surfaces opposite to the push switch 200. That is, the thin plate portion 150 is provided by a generally U-shaped space formed between an end surface of the blade portion 113 of the first arm member 110 and an end surface of the second arm member 120.

Also in this recording-medium mis-recording preventing mechanism, by loading a video tape with its judgement claw not removed, the arm portion 100 is rotated in the direction of the arrow A in FIG. 2. Then, the switch surface 123 abuts against the switch pin 210 of the push switch 200 to thereby turn the push switch 200 on. In addition, at the beginning of the rotation, the reaction of the switch pin 210 overcomes the elastic force of the spring 130 so that the second arm member 120 connected by the thin plate portion 150 rotates in the direction of the arrow B in FIG. 2. Accordingly, a shock given to the arm portion 100 by the loaded video tape is softened so that the influence on the push switch 200 can be reduced.

Also an arm portion 100 shown in FIG. 3 is the same in structure as the arm portions 100 shown in FIGS. 1 and 2 except for the structure of connection between the first arm member 110 and the second arm member 120 and the shape of the plate spring portion 170.

In this arm portion 100, the connection side of the second arm member 120 is formed wider so that the second arm member 120 has a trapezoidal shape in plan view. An end of the thin plate portion 150 is mounted directly on a side end surface of the second arm member 120 without providing the thin plate support portion 127.

In addition, a slight gap is provided between an end surface of the blade portion 113 of the first arm member 110 and an end surface of the second arm member 120. In addition, the thin plate support portion 117 of the first arm member 110 is formed so as to be curved largely toward the outside, and the thin plate portion 150 is disposed almost in parallel with the blade portion 113.

The plate spring portion 170 is disposed so as to be almost in parallel from the pivot portion 111, and formed so as to be bent at its front end.

Even with the arm portion 100 having such a shape, a similar effect can be obtained.

It shall be noted that, the present invention is not limited to a video tape deck, but it is applicable also to various recording devices using a recording cassette medium, such as a cassette tape deck, or a floppy disk drive, in which a judgement claw can be provided.

In a recording-medium mis-recording preventing mechanism according to the present invention, an arm portion includes: a first arm member pivoted on a deck body and having a detection portion for abutting against a judgement claw provided on a recording medium so as to be removable by bending; a second arm member for pushing a push switch for detecting whether a recording medium is recordable or not; a spring provided between the first arm member and the second arm member for urging the second arm member toward the push switch; a thin plate portion for connecting the first arm member and the second arm member to each other; and a plate spring portion provided on the first arm member for making the arm portion return to its initial position. Accordingly, the arm portion except for the spring can be made up integrally so that the number of constituent parts can be reduced to two from four which is in the conventional case. It is therefore possible to reduce the manufacturing cost of the arm portion and to assemble the mechanism easily.

In addition, a shock generated in the first arm member abutting against the judgement claw of the recording medium is softened by the spring and the thin plate portion. Accordingly, in the same manner as in a conventional recording-medium mis-recording preventing mechanism, it is possible to reduce the influence on the push switch.

What is claimed is:

1. A mechanism for preventing a mis-recording on a recording "cassette" medium loaded in a recording unit and the mechanism being removably provided with a recordable judgement member, comprising:
   a push switch for indicating a recordable state of a recording medium when said push switch is pushed;
   a first arm member pivoted on said recording unit and having a detection portion for detecting whether said recordable judgement member is removed;
   a first elastic member integrally formed on said first arm member for urging said detection portion so as to abut against said recordable judgement member;
   a second arm member for pushing said push switch by pivot motion of said first arm member when said recordable judgement member is not removed;
   a deformable member integrally connecting a part of said first arm member and a part of said second arm member and being deformed by a reaction force generated when said second arm member pushes said push switch; and
   a second elastic member connected to said first arm member and said second arm member, for providing an urging force so as to prevent deformation of said deformable member.

2. The detection mechanism according to claim 1, wherein said first arm member and said second arm member abut each other,
   wherein said first and second arm members separate by deformation of said deformable member, and
   wherein the urging force of said second elastic member acts to prevent the separation of said first and second arm members from abutting each other.

3. The detection mechanism according to claim 1, wherein said deformable member connects said first arm member and said second arm member while providing a gap therebetween, and
   wherein said gap is spread open by the deformation of said deformable member, and
   wherein said urging force of said second elastic member acts to prevent spreading of said gap.

4. The detection mechanism according to claim 1, wherein said first and second arm members, said deformable member, and said first elastic member are one-piece construction.

5. The detection mechanism according to claim 1, wherein said second elastic member is a tension spring, and said first elastic member is a plate spring.

6. A detection arm for pushing a push switch for detecting whether a recording medium loaded in a recording unit and having a recordable judgement member is recordable, comprising:
   a first arm member pivoted on said recording unit and having a detection portion for detecting whether said recordable judgement member is removed;
   a first elastic member integrally formed on said first arm member for urging said detection portion so as to abut against said recordable judgement member;
   a second arm member for pushing said push switch by the pivot motion of said first arm member when said recordable judgement member is not removed;
   a deformable member integrally connecting a part of said first arm member and a part of said second arm member, and being deformed by a reaction force generated when said second arm member pushes said push switch; and
   a second elastic member connected to said first arm member and said second arm member for providing an urging force so as to prevent deformation of said deformable member.

7. The detection arm according to claim 6, wherein said first and second arm members abut each other, and
   said first and second arm members separate by deformation of said deformable member, and
   the urging force of said second elastic member acts to prevent the separation of said first and second arm members from abutting each other.

8. The detection arm according to claim 6, wherein said deformable member connects said first and second arm member while providing a gap therebetween; and
   said gap is spread open by deformation of said deformable member, and
   wherein said urging force of said second elastic member acts to prevent spreading of said gap.

9. The detection arm according to claim 6, wherein said first and second arm members, said deformable member, and said first elastic member are of one piece construction.

10. The detection arm according to claim 6, wherein said deformable member aids in softening of shocks due to the insertion of said recording medium in the recording unit.

* * * * *